United States Patent
Cohen et al.

(10) Patent No.: US 12,273,370 B1
(45) Date of Patent: *Apr. 8, 2025

(54) SYSTEM AND METHOD FOR DETECTING CYBERSECURITY RISKS IN MANAGED ARTIFICIAL INTELLIGENCE MODELS

(71) Applicant: Wiz, Inc., New York, NY (US)

(72) Inventors: Amitai Cohen, Kfar Saba (IL); Barak Sharoni, Tel Aviv (IL); Alon Schindel, Tel Aviv (IL); Alon Weiss, Tel Aviv (IL); Itay Arbel, Tel Aviv (IL); George Pisha, Giv'atayim (IL); Maayan Laav, Tel Aviv (IL); Liron Levin, Kfar Saba (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,749

(22) Filed: May 23, 2024

Related U.S. Application Data

(63) Continuation of application No. 18/584,670, filed on Feb. 22, 2024, now Pat. No. 12,028,368.

(51) Int. Cl.
*H04L 9/40* (2022.01)
*G06F 21/62* (2013.01)

(52) U.S. Cl.
CPC ...... *H04L 63/1433* (2013.01); *G06F 21/6218* (2013.01); *H04L 63/0823* (2013.01)

(58) Field of Classification Search
CPC ............. H04L 63/1433; H04L 63/0823; G06F 21/6218
See application file for complete search history.

(56) References Cited

U.S. PATENT DOCUMENTS

| | | | |
|---|---|---|---|
| 10,558,823 B2 | 2/2020 | Schroeder et al. | |
| 12,003,529 B1 * | 6/2024 | Cohen | H04L 63/1441 |
| 12,028,368 B1 * | 7/2024 | Cohen | G06F 21/577 |
| 2019/0156122 A1 * | 5/2019 | Lu | G06V 10/761 |
| 2021/0334078 A1 * | 10/2021 | Saxon | G06N 20/00 |
| 2022/0030009 A1 | 1/2022 | Hasan | |
| 2022/0383199 A1 | 12/2022 | Banis et al. | |
| 2022/0400131 A1 | 12/2022 | Shao et al. | |
| 2023/0004892 A1 * | 1/2023 | Rasumov | H04L 63/1483 |

(Continued)

FOREIGN PATENT DOCUMENTS

| | | | | |
|---|---|---|---|---|
| CN | 110113348 A | * | 8/2019 | |
| CN | 112769821 A | * | 5/2021 | G06F 21/53 |

(Continued)

*Primary Examiner* — Sarah Su
(74) *Attorney, Agent, or Firm* — M&B IP Analysts, LLC

(57) ABSTRACT

A system and method for detecting a combined cybersecurity risk for an artificial intelligence (AI) model is presented. The method includes: inspecting a computing environment for an AI model deployed therein; generating a representation of the AI model in a security database, the security database including a representation of the computing environment; detecting a first cybersecurity risk respective of the AI model; inspecting the computing environment for a cybersecurity object; determining that the AI model is exposed to a toxic combination cybersecurity risk based on the detected first cybersecurity risk and the cybersecurity object; and initiating a mitigation action based on the toxic combination cybersecurity risk.

25 Claims, 7 Drawing Sheets

(56) References Cited

U.S. PATENT DOCUMENTS

| | | |
|---|---|---|
| 2023/0156026 A1 | 5/2023 | Kim et al. |
| 2023/0259640 A1* | 8/2023 | Metzler .............. G06F 21/6218 713/191 |
| 2023/0300165 A1* | 9/2023 | Fricano ................. H04L 63/20 726/25 |
| 2024/0039936 A1 | 2/2024 | Pisha et al. |
| 2024/0098100 A1* | 3/2024 | Lal ...................... H04L 63/1441 |

FOREIGN PATENT DOCUMENTS

| | | | | |
|---|---|---|---|---|
| CN | 115104288 A | * | 9/2022 | ........... G06F 21/552 |
| EP | 3857407 B1 | * | 4/2023 | ........... G06F 16/907 |
| WO | WO-2019246230 A1 | * | 12/2019 | ........... G01V 5/0008 |
| WO | WO-2020030913 A1 | * | 2/2020 | ........... G06K 9/6215 |
| WO | WO-2020098955 A1 | * | 5/2020 | ........... H04L 63/04 |
| WO | WO-2022150620 A1 | * | 7/2022 | ........... H04L 41/16 |
| WO | WO-2022215088 A1 | * | 10/2022 | |

* cited by examiner

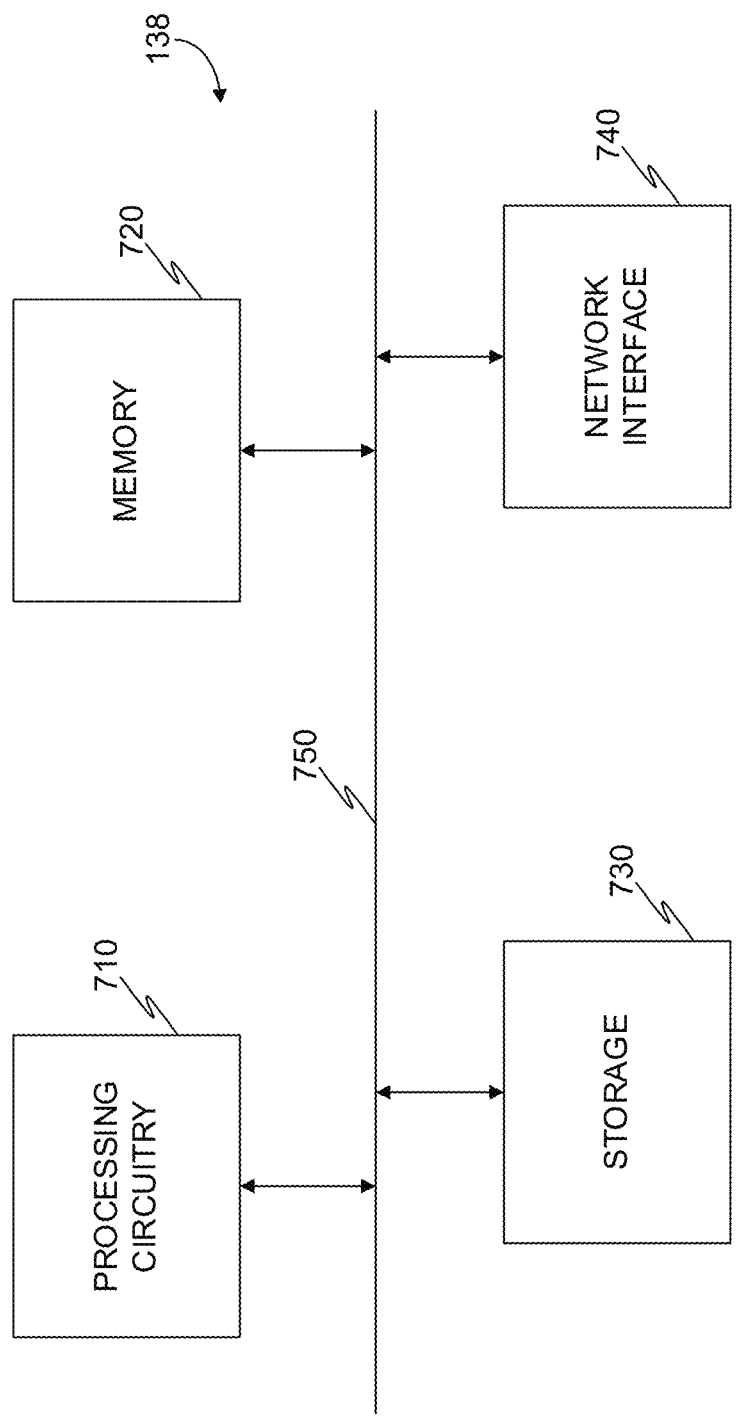

SYSTEM AND METHOD FOR DETECTING CYBERSECURITY RISKS IN MANAGED ARTIFICIAL INTELLIGENCE MODELS

CROSS-REFERENCE TO RELATED APPLICATION

This application is a continuation of U.S. patent application Ser. No. 18/584,670 filed Feb. 22, 2024, now allowed, the contents of which are hereby incorporated by reference.

TECHNICAL FIELD

The present disclosure relates generally to detecting artificial intelligence models, and specifically to implementing cybersecurity monitoring solutions on an AI pipeline of a cloud computing environment.

BACKGROUND

Artificial intelligence (AI) applications are increasingly prevalent, as costs of computing hardware have plummeted significantly, and as AI models have improved their computational resource consumption.

This explosion in AI applications, with a rush to deploy AI solutions in various endeavors, presents new cybersecurity risks. Security teams lack knowledge and experience in AI systems, which can lead to vulnerabilities in implementations. AI systems are complex and ever-evolving, require new software tools that security teams may not be aware of, and also do not always have cybersecurity awareness about.

For example, an AI model may leak data, for example exposing sensitive data, secrets, etc. An AI model may be vulnerable to manipulation, such as by poisoning the training data. As with any rapidly evolving technology, the pace of evolution means that attackers can find an advantage over security teams.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include inspecting a computing environment for an AI model deployed therein. Method may also include generating a representation of the AI model in a security database, the security database including a representation of the computing environment. Method may furthermore include detecting a first cybersecurity risk respective of the AI model. Method may in addition include inspecting the computing environment for a cybersecurity object. Method may moreover include determining that the AI model is exposed to a toxic combination cybersecurity risk based on the detected first cybersecurity risk and the cybersecurity object. Method may also include initiating a mitigation action based on the toxic combination cybersecurity risk. Other embodiments of this aspect include corresponding computer systems, apparatus, and computer programs recorded on one or more computer storage devices, each configured to perform the actions of the methods.

Implementations may include one or more of the following features. Method may include: initiating the mitigation action further based on any one of: the first cybersecurity risk, the cybersecurity object, and a combination thereof. Method may include: querying an application programming interface (API) of the computing environment to detect the AI model deployed therein. Method may include: receiving a list of AI model identifiers in response to the API query. Method may include: generating an inspectable disk based on an original disk of a resource deployed in the computing environment; and inspecting the inspectable disk for any one of: the AI model, the cybersecurity object, and a combination thereof. Method may include: detecting an artifact of the AI model on the inspectable disk. Method may include: inspecting the AI model to detect an AI model configured to execute a code object. Method may include: detecting a metadata of the AI model, where the metadata indicates that the AI model is a cybersecurity risk. Method may include: detecting in the AI model any one of: a secret, a certificate, a code, and any combination thereof. Method may include: applying a policy on the representation of the computing environment. Method may include: initiating the mitigation action based on the policy. Method where the cybersecurity object indicates any one of: a vulnerability, an exposure, a misconfiguration, and a combination thereof. Implementations of the described techniques may include hardware, a method or process, or a computer tangible medium.

In one general aspect, non-transitory computer-readable medium may include one or more instructions that, when executed by one or more processors of a device, cause the device to: inspect a computing environment for an AI model deployed therein. Medium may furthermore generate a representation of the AI model in a security database, the security database including a representation of the computing environment. Medium may in addition detect a first cybersecurity risk respective of the AI model. Medium may moreover inspect the computing environment for a cybersecurity object. Medium may also determine that the AI model is exposed to a toxic combination cybersecurity risk based on the detected first cybersecurity risk and the cybersecurity object. Medium may furthermore initiate a mitigation action based on the toxic combination cybersecurity risk. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: inspect a computing environment for an AI model deployed therein. System may in addition generate a representation of the AI model in a security database, the security database including a representation of the computing environment. System may moreover detect a first cybersecurity risk respective of the AI model. System may also inspect the computing environment for a cybersecurity object. System may furthermore determine that the AI model is exposed to a toxic combination cybersecurity risk based on the detected first cybersecurity risk and the cybersecurity object. System may in addition initiate a mitigation action based on the toxic combination cybersecurity risk. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: initiate the mitigation action further based on any one of: the first cybersecurity risk, the cybersecurity object, and a combination thereof. System where the memory contains further instructions which when executed by the processing circuitry further configure the system to: query an application programming interface (API) of the computing environment to detect the AI model deployed therein. System where the memory contains further instructions which when executed by the processing circuitry further configure the system to: receive a list of AI model identifiers in response to the API query. System where the memory contains further instructions which when executed by the processing circuitry further configure the system to: generate an inspectable disk based on an original disk of a resource deployed in the computing environment; and inspect the inspectable disk for any one of: the AI model, the cybersecurity object, and a combination thereof. System where the memory contains further instructions which when executed by the processing circuitry further configure the system to: detect an artifact of the AI model on the inspectable disk. System where the memory contains further instructions which when executed by the processing circuitry further configure the system to: inspect the AI model to detect an AI model configured to execute a code object. System where the memory contains further instructions which when executed by the processing circuitry further configure the system to: detect a metadata of the AI model, where the metadata indicates that the AI model is a cybersecurity risk. System where the memory contains further instructions which when executed by the processing circuitry further configure the system to: detect in the AI model any one of: a secret, a certificate, a code, and any combination thereof. System where the memory contains further instructions which when executed by the processing circuitry further configure the system to: apply a policy on the representation of the computing environment. System where the memory contains further instructions which when executed by the processing circuitry further configure the system to: initiate the mitigation action based on the policy. System where the cybersecurity object indicates any one of: a vulnerability, an exposure, a misconfiguration, and a combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 7 is an example schematic diagram of an AI detector according to an embodiment.

DETAILED DESCRIPTION

Figure 1:
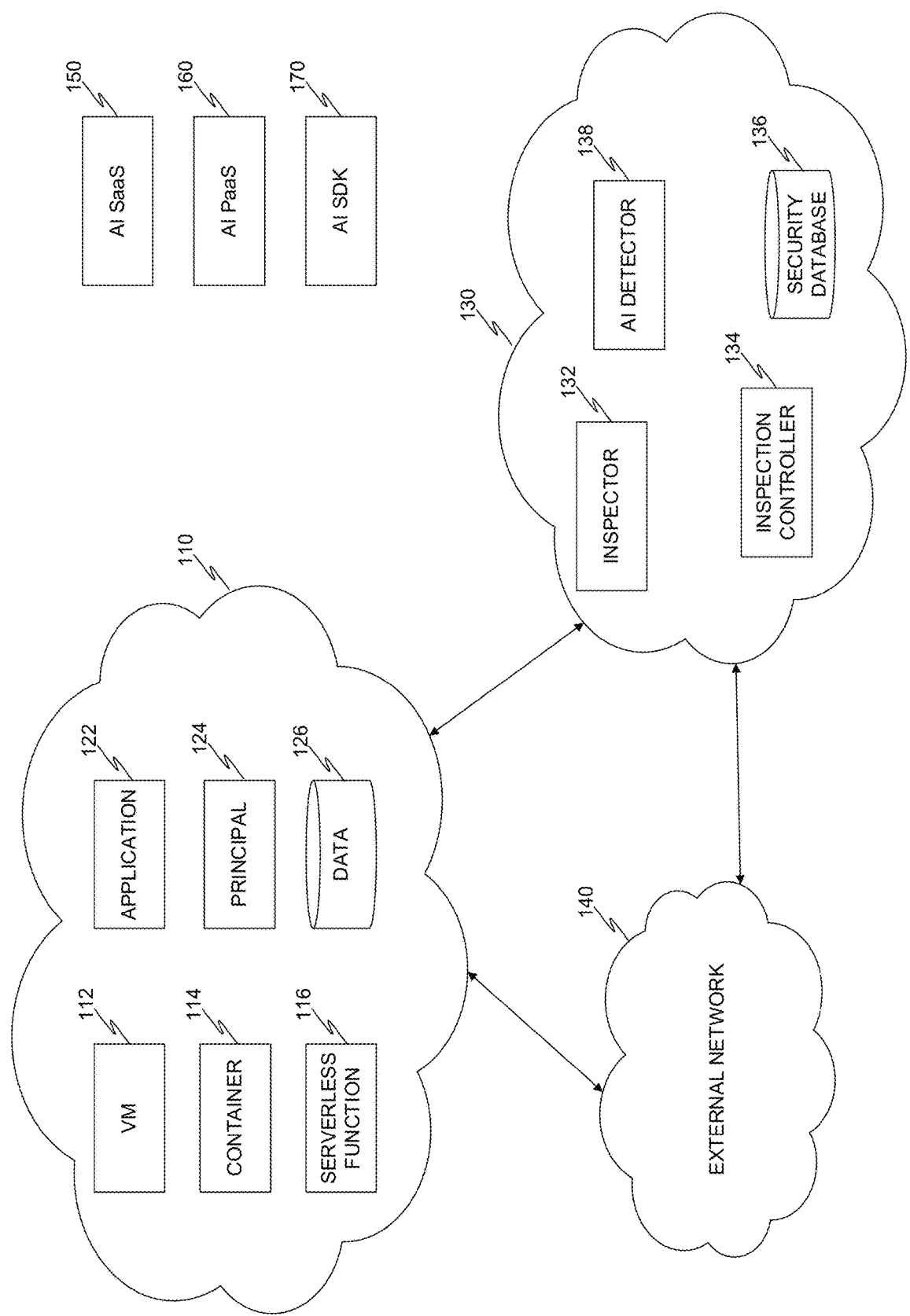
FIG. 1 is an example schematic illustration of a cloud computing environment for supporting an artificial intelligence (AI) pipeline, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating an AI pipeline. In an embodiment, an AI pipeline representation is generated. In some embodiments, the AI pipeline representation includes AI components detected across multiple cloud computing environments. In certain embodiments, the multiple cloud computing environments are not otherwise connected.

FIG. 1 is an example schematic illustration of a cloud computing environment for supporting an artificial intelligence (AI) pipeline, utilized to describe an embodiment. In an embodiment, a cloud computing environment 110 includes cloud entities, such as resources, principals, and the like.

In certain embodiments, the cloud computing environment 110 is implemented as a tenant, as a virtual private cloud (VPC), as a virtual network (VNet), a combination thereof, and the like. In some embodiments, the cloud computing environment 110 is deployed on a cloud computing infrastructure, such as Amazon® Web Service (AWS), Google® Cloud Platform (GCP), Microsoft® Azure, and the like.

In an embodiment, a resource is a cloud entity which exposes hardware resources (e.g., provides access to a processor, a memory, a storage, a combination thereof, and the like), exposes services, exposes an application programming interface (API), a combination thereof, and the like.

In some embodiments, a principal 124 is a cloud entity which is authorized to initiate actions in the cloud computing environment 110, authorized to act on a resource, a combination thereof, and the like.

For example, according to an embodiment, a principal is a user account, a service account, a role, a combination thereof, and the like. In some embodiments, a resource is a virtual machine, a software container, a serverless function, an application, a database, a combination thereof, and the like.

In certain embodiments, a virtual machine 112 is deployed in the cloud computing environment 110. In some embodiments, the virtual machine 112 is implemented as Oracle® VirtualBox®, for example. In an embodiment, the virtual machine 112 is associated with a disk (not shown).

In an embodiments, a software container 114 is deployed in the cloud computing environment 110. In some embodiments, the software container 114 is implemented utilizing a Kubernetes® Platform, a Docker® container engine, a combination thereof, and the like.

According to an embodiment, a serverless function 116 is deployed in the cloud computing environment 110. In certain embodiments, the serverless function 116 is implemented as an Amazon® Lambda® service.

In some embodiments, an application 122 is deployed in the cloud computing environment. In an embodiment, an application is deployed utilizing a resource, a plurality of resources, and the like. In some embodiments, an application 122 includes a software library, a software binary, an executable code, a combination thereof, and the like.

In an embodiment, the application 122 is a component of an artificial intelligence (AI) pipeline. According to an embodiment, an AI pipeline is utilized to provide a service utilizing an AI model. For example, in an embodiment, an AI pipeline includes software components, such as an AI model, a training data, an API, a combination thereof, and the like. In some embodiments, an AI pipeline includes resource components such as a serverless function 116, a software container 114, a virtual machine 112, a combination thereof, and the like.

For example, in an embodiment, an application 122 is hosted on a virtual machine 112. A serverless function 116 is configured to receive a prompt, which is then directed to an AI model, such as a large language model (LLM) to produce an output.

In an embodiment, the AI model is trained on a data set stored, for example, in a database 126. In some embodiments, an AI model is trained on a database 126 in a first cloud computing environment (e.g., a development environment), and the application 122 is deployed in a second cloud computing environment (e.g., a production environment).

According to some embodiments, this presents a challenge, for example where the database 126 includes sensitive information which is used to train the AI model, but the data itself should not become exposed through use of the AI model. Furthermore, in certain embodiments, a cybersecurity risk severity is determined based on a degree of exposure. For example, allowing read access to the database 126 through the AI model is relatively less risky, than allowing write access to the database 126, according to some embodiments. Write access allows data poisoning, while read access does not.

In an embodiment, an AI model includes an artificial neural network (ANN), a recurrent neural network (RNN), a convolutional neural network (CNN), a generative adversarial neural network (GAN), a Bayesian network, a hidden Markov model, a large language model (LLM), a combination thereof, and the like.

In an embodiment, an AI pipeline includes resources, principals, and the like, which are utilized in providing a service based, for example, on an AI model. In an embodiment, a first component of the AI pipeline is connected to a second component of the AI pipeline, for example by a network policy allowing the first component to access the second component.

In some embodiments, the cloud computing environment 110 is accessible by an external network 140. In an embodiment, the external network 140 includes computing devices, user accounts, and the like, which are not affiliated with the cloud computing environment 110, but receive a service, access to a resource, access to an application, a combination thereof, and the like. According to an embodiment, the external network 140 is, for example, the Internet.

In certain embodiments, the cloud computing environment 110 is monitored for cybersecurity objects, threats, risks, and the like, by an inspection environment 130. In an embodiment, the inspection environment 130 is configured to monitor the cloud computing environment 110 for cybersecurity objects, threats, risks, combinations thereof, and the like.

In some embodiments, an inspector 132 is configured to inspect a workload of the cloud computing environment 110 for a cybersecurity object. An inspector 132 is implemented, in certain embodiments, as a resource, such as a virtual machine, a software container, a serverless function, a combination thereof, and the like. In some embodiments, it is advantageous to implement the inspector 132 as a node in software container, as this allows scaling of the inspection environment 130 to accommodate the inspection needs of the cloud computing environment 110.

In certain embodiments, an inspector 132 is configured to inspect a workload for a cybersecurity object such as a hash, a malware, a signature, an application, an operating system, a binary, a library, a computer code object, a code object of an infrastructure as code file, a registry file, a password stored as text (e.g., cleartext, plaintext, etc.), a certificate, a cryptographic key, a vulnerability, an exposure, a misconfiguration, a combination thereof, and the like.

For example, according to an embodiment, an inspector 132 is configured to detect a misconfiguration based on configuration rules. In an embodiment, a configuration rule is applied to a representation of a cybersecurity object, a representation of a workload, a representation of a principal, a combination thereof, and the like.

In an embodiment, an inspector 132 is configured to detect a component of an AI pipeline. In an embodiment, a component of an AI pipeline includes a model (e.g., stored as a file on a storage, a repository, and the like), a database, a training dataset, a serverless function configured to train the AI model using the training dataset stored on the database, an AI application, an AI application endpoint, an API, a combination thereof, and the like.

In certain embodiments, the inspector 132 is configured to detect a network path between an external network 140, and a component of the AI pipeline. For example, in an embodiment, a network path includes resources, applications, and the like, between the external network path 140, and the application 122. In some embodiments, where the network path exposes a resource, exposes data, and the like, to the external network, the network path is determined to be an exposure path.

In some embodiments, the inspector 132 is configured to query a cloud API to detect cloud entities, such as resources and principals, in the cloud computing environment 110. In certain embodiments, the inspector 132 is configured to query a Platform as a Service (PaaS) to detect an assistant, a list of assistant files, a list of runs belonging to a thread, a list of files associated with a principal, a list of models, a list of available AI models, metadata related to each AI model, a list of messages for a thread, an action, a function, a training dataset, a document, a training job, a thread, a combination thereof, and the like.

According to an embodiment, the inspector 132 is configured to inspect a network and detect network objects, such as resources deployed in a cloud computing environment 110. For example, in an embodiment, a network object is a server, a firewall, a web-access firewall (WAF), a load balancer, a gateway, a proxy server, a combination thereof, and the like.

In some embodiments, the inspector 132 is configured to detect identities deployed in the cloud computing environment 110. In an embodiment, an identity is a user account, a service account, a role, an email address, a security credential associated with an identity, a combination thereof, and the like.

In certain embodiments, the inspector 132 is configured to inspect a registry, a command-line interface (CLI), a PaaS, a SaaS, a network, an IAM service, a resource, a combination thereof, and the like, to detect a cybersecurity object. In some embodiments, the inspector 132 is further configured to inspect an SDK.

According to an embodiment, an inspector 132 is configured to inspect a first cloud computing environment (e.g., a production environment) and a second cloud computing environment (e.g., a development environment). This is advantageous as AI pipelines are often split among a plurality of computing environments. For example, according to an embodiment, an AI model is trained in a development environment, and deployed in a production environment.

In some embodiments, it is advantageous to generate a pipeline as a view which allows to see a complete AI pipeline through, and including, multiple cloud computing environments. This allows visibility into, for example, an AI model trained on sensitive data, which could potentially leak in a production environment, despite the sensitive data being actually stored in the development environment.

In an embodiment, the inspection environment 130 further includes an inspection controller 134. In some embodiments, the inspection controller 134 is configured to provision inspector workloads in response to detecting a demand for inspection workloads. In certain embodiments, the inspection controller 134 is configured to generate a copy, a clone, a snapshot, a combination thereof, and the like, in the cloud computing environment 110, in the inspection environment 130, and the like, based on a disk associated with a workload in the cloud computing environment 110.

In certain embodiments, it is advantageous to generate a clone of a disk, as a clone utilizes less resources than a snapshot, for example. In an embodiment, a clone is generated by generating a pointer to the same storage address of the original data, thereby providing instantaneous access to the 'cloned' disk. In certain embodiments, access to a snapshot is only provided after the snapshot process has completed generating the snapshot.

In an embodiment, the inspection environment 130 further includes a security database 136. In some embodiments, the security database 136 is configured to store a representation of the cloud computing environment 110, for example based on a predetermined data schema. In an embodiment, a unified data schema is utilized, including templates for example for representing a resource, representing a principal, representing an enrichment, representing a cybersecurity issue, a combination thereof, and the like.

In some embodiments, the security database 136 is implemented as a columnar database, a SQL database a non-SQL database, a table, a plurality of tables, a graph database, combinations thereof, and the like. For example, in an embodiment, a security database 136 is implemented as a graph database, such as Neo4j®.

In certain embodiments, the inspection environment 130 further includes an AI detector 138. In an embodiment, the AI detector 138 is configured to generate an AI pipeline. In some embodiments, an AI pipeline is a representation, for example stored in a security database 136. In an embodiment, the AI pipeline includes representations of AI components, and connections between the AI components.

For example, according to an embodiment, a dataset used for training an AI model is an AI component. In some embodiments, a dataset is determined to be used for training by detecting that a dataset stored in, for example, a storage bucket, is accessed by a serverless function configured to train an AI model. In an embodiment, the storage bucket is represented as a resource in the security database, and the representation of the storage bucket is further associated with the AI pipeline.

In certain embodiments, the AI detector 138 is configured to detect various AI components across multiple cloud computing environments. For example, in an embodiment, an AI model is trained in a first cloud computing environment (e.g., a development environment) and deployed in a second cloud computing environment (e.g., a production environment).

Therefore, in some embodiments, an AI pipeline includes components which are deployed in a plurality of cloud computing environments. In certain embodiments, the AI detector 138 is configured to detect that a component deployed in a first cloud computing environment is accessible by, or is configured to access, a component deployed in a second cloud computing environment.

In some embodiments, the cloud computing environment 110 is configured to access a service, access a platform, access a software development kit (SDK), and the like. In certain embodiments, the cloud computing environment 110 includes deployed instances of AI components, such as AI models, managed AI service instances, a combination thereof, and the like. For example, in an embodiment, the cloud computing environment 110 is configured to access an AI SaaS 150, an AI PaaS 160, an AI SDK 170, a combination thereof, and the like.

According to an embodiment, an AI SaaS 150 is, for example Google® TensorFlow®, and the like. In some embodiments, an AI PaaS 160 is, for example, OpenAIR, Hugging Face®, and the like. In some embodiments, a cloud computing infrastructure, such as the cloud computing infrastructure on which the cloud computing environment 110 is deployed on, is configured to deploy managed AI services, such as Amazon® Bedrock, Azure AI Service, GCP Vertex AI, and the like.

Figure 2:
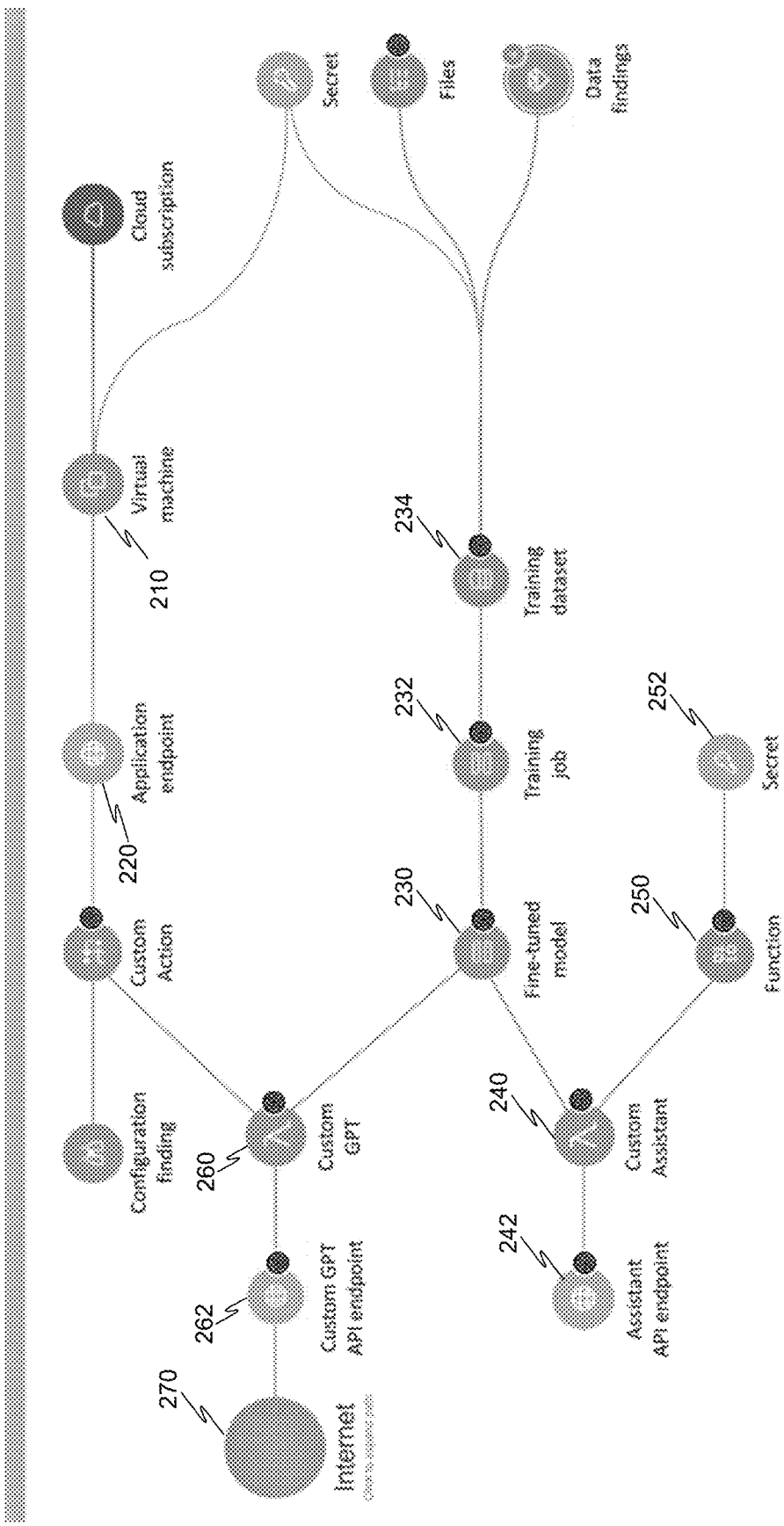
FIG. 2 is an example security graph representation of an AI pipeline, implemented in accordance with an embodiment.

FIG. 2 is an example security graph representation of an AI pipeline, implemented in accordance with an embodiment. In an embodiment, a security database is implemented as a graph database, based on a unified data schema. In some embodiments, the security database includes a plurality of nodes and connections between the nodes.

For example, in an embodiment, a node represents a resource, a principal, a cybersecurity object, a misconfiguration, a vulnerability, an exposure, a malware object, an enrichment, a remediation action, combinations thereof, and the like.

In some embodiments, a connection between nodes indicates a relationship between the objects represented by the nodes. For example, in an embodiment, a node representing an application 220 is connected to a node representing a virtual machine 210, indicating that the application represented by application node 220 is deployed on the virtual machine represented by the virtual machine node 210.

In an embodiment, a representation of a fine-tuned model 230 is generated in response to detecting a fine-tuned AI model. In some embodiments, detecting a fine-tuned model includes accessing an API of an AI SaaS provider, and pulling a list of AI models accessible by an account. In an embodiment, the account identifier is provided, for example, to an AI detector. In certain embodiments, detecting a fine-tuned model includes accessing an API of an AI PaaS provider, such as Amazon Bedrock, and pulling a list of AI models accessible by the account.

In certain embodiments, detecting a fine-tuned model includes detecting API calls in a networked environment directed to a known predefined AI SaaS, AI PaaS, combination thereof, and the like.

In an embodiment, a serverless function is utilized to implement an application, such as a custom assistant application. In some embodiments, the serverless function is detected, for example by an inspector configured to detect virtual instances in a computing environment. In an embodiment, a representation of the serverless function is generated in a security database, for example as custom assistant node 240.

In an embodiment, an inspector is configured to detect that the custom assistant represented by the custom assistant node 240 accesses the fine-tuned model represented by fine-tuned model node 230. In some embodiments, the serverless function deploying the custom assistant includes an API through which the serverless function is configured to receive calls, represented by AI endpoint 242.

In certain embodiments, the serverless function is further configured to access a function, represented by function node 250, which in turn includes a secret, represented by secret node 252. In some embodiments, the serverless function is deployed in a production environment.

In an embodiment, a trainer is configured to train an AI model, such as a generative pre-trained transformer (GPT) model, into the fine-tuned model represented by the fine-tuned model node 230. In some embodiments, the trainer is implemented as a virtual instance in development environment, for example as a serverless function. In an embodiment, the trainer is represented by a training job node 232.

In certain embodiments, a first inspector is configured to detect the serverless function in the production environment (e.g., represented by the custom assistant node 240), and a second inspector is configured to detect the trainer (represented by the training job node 232) in the development environment.

In an embodiment, an AI detector is configured to detect a connection between the trainer and the serverless function (i.e., between the training job node 232 and the custom assistant node 240). For example, in an embodiment, the AI detector is configured to detect that the trainer is configured to store a trained AI model in a bucket, which is accessed by the serverless function.

Generating a representation including a connection between multiple computing environment to generate a pipeline is advantageous, as this allows to detect vulnerabilities, exposures, and the like, including risk combinations (e.g., vulnerability and exposure) which are not otherwise apparent when a representation includes only components of one computing environment, where a pipeline utilizes multiple components from multiple computing environments.

According to an embodiment, a trainer is configured to train an AI model using a training dataset, represented by training dataset node 234. In some embodiments, the training dataset is stored, for example as a file, a plurality of files, and the like, on a storage, such as a network-accessible storage device, a cloud based storage service, a combination thereof, and the like.

In certain embodiments, the training dataset includes sensitive data. In an embodiment, it is advantageous to maintain a separation between sensitive data in a development environment, and an application (such as the custom assistant, a custom GPT, etc.) in a production environment, where the application is exposed to an external network, such as the Internet.

For example, in an embodiment, an API endpoint (represented by custom GPT API endpoint 262) is configured to receive an input from a user account over an external network (i.e., external to where the custom GPT is deployed). In some embodiments, the API endpoint is an endpoint for a custom GPT (represented by custom GPT node 260). In an embodiment, the custom GPT is configured to utilize a fine-tuned model (represented by fine-tuned model node 230).

In some embodiments, the custom GPT is deployed in a production environment, while the trainer is deployed in a development environment. Representing the pipeline allows to detect a cybersecurity risk which is not apparent when each computing environment is viewed individually. In this example, the custom GPT is exposed to an external network (i.e., represented by the Internet node 270). In an embodiment, the custom GPT is configured to utilize the fine-tuned AI model which utilizes a training dataset that includes sensitive data.

In certain embodiments, this AI pipeline indicates a cybersecurity risk of exposing sensitive data through the custom GPT, by utilizing the fine-tuned model trained on the sensitive data.

Figure 3:
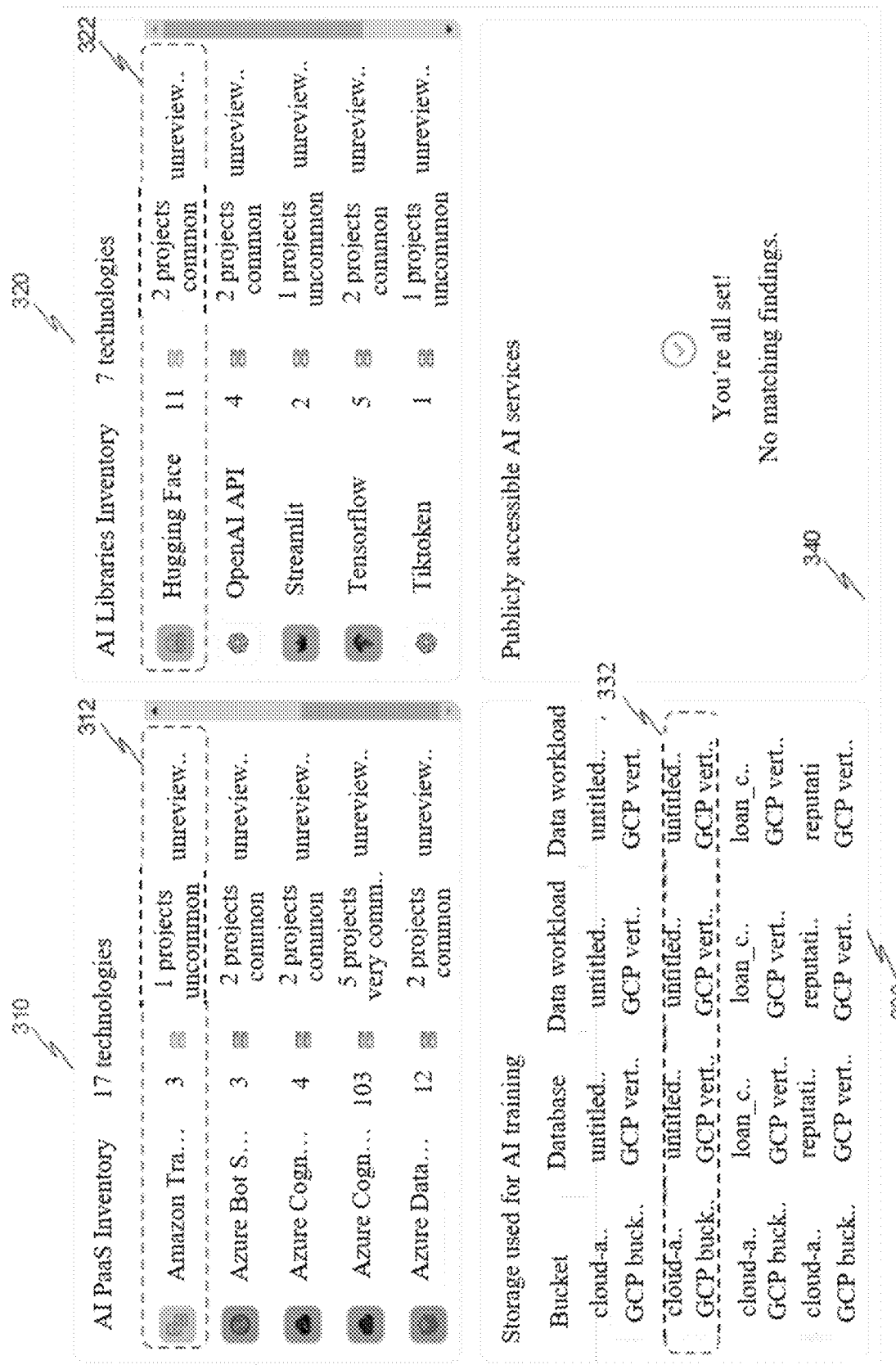
FIG. 3 is an example dashboard visualization showing an AI software bill of materials (SBOM), implemented in accordance with an embodiment.

FIG. 3 is an example dashboard visualization showing an AI software bill of materials (SBOM), implemented in accordance with an embodiment. In an embodiment, an AI SBOM is generated based on detection of a plurality of AI components deployed in a computing environments, in a combination of environments, etc.

For example, in an embodiment, an AI detector is configured to generate an AI SBOM based on data detected by an inspector. In some embodiments, an AI SBOM includes identifiers of software, an application, an endpoint, a storage device, a library, a binary, a SaaS application, a PaaS connection, a resource identifier, a principal identifier, a dataset identifier, a database identifier, combinations thereof, and the like.

In an embodiment, the dashboard includes an AI PaaS Inventory widget 310. In some embodiments, the AI PaaS Inventory widget 310 includes a plurality of rows, each row representing an AI PaaS connected to the computing environment. For example, a first row 312 includes a visual representation of an Amazon® Transcribe® service. In some embodiments, the AI PaaS inventory widget 310 includes representations of Azure® bot service, Azure cognitive services, and the like.

In certain embodiments, the dashboard includes an AI library inventory widget 320. In an embodiment, the AI library inventory widget includes various platforms, systems, libraries, and the like, which are accessible by the computing environment. For example, in an embodiment, a first row 322 includes a representation of Hugging Face® transformers. In some embodiments, the AI library inventory widget includes representations of, for example, OpenAIR API, Streamlit, Google® Tensorflow®, Tiktoken, a combination thereof, and the like.

In an embodiment, the dashboard further includes a storage widget 330. In some embodiments, the storage widget 330 includes a visual representation of a storage device, storage service, and the like, utilized by a computing environment for AI applications, AI data, AI services, etc. For example, in an embodiment, a first row 332 represents a Google® Cloud Platform (GCP) bucket. In some embodiments, a bucket is utilized to store, for example, training data.

In certain embodiments, the dashboard includes an AI services widget 340. In some embodiments, the AI services widget 340 includes a visual representation of AI services which are publicly accessible (e.g., accessible from a network external to the computing environment, such as the Internet). In an embodiment, an AI service is determined to be a publicly accessible service in response to detecting an API endpoint associated with the AI service.

In certain embodiments, an AI detector is configured to detect an AI pipeline, and further to generate an AI dashboard based on the detected AI pipeline. In some embodiments, a widget of the AI dashboard is updated with data based on querying a representation of the AI pipeline, such as stored on a graph in a graph database, for example as discussed in more detail in FIG. 2 above.

Figure 4:
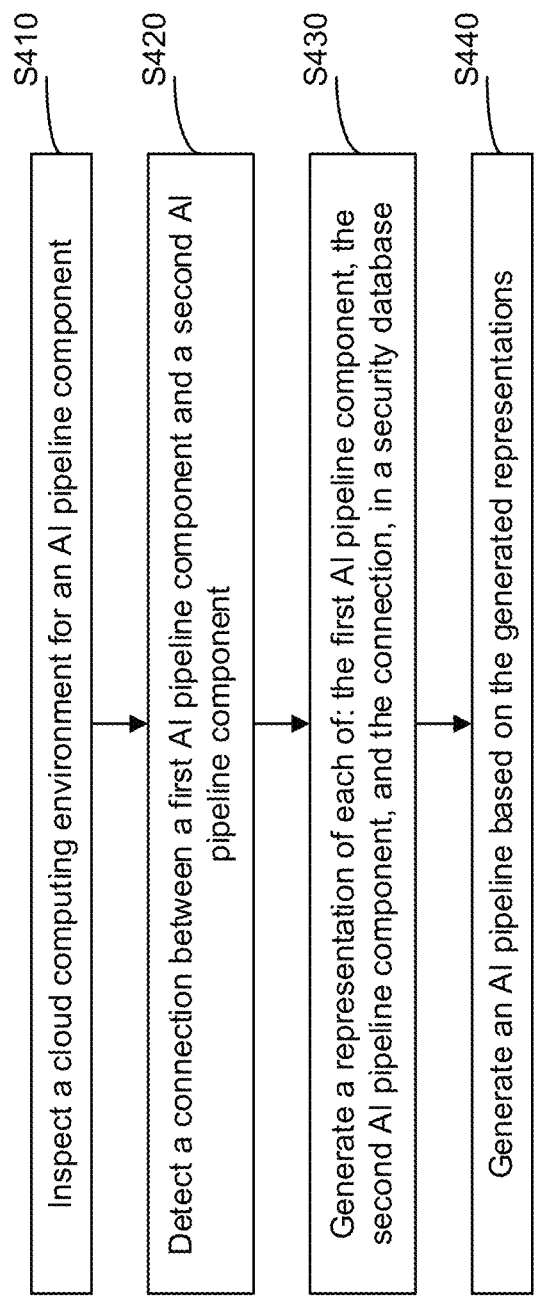
FIG. 4 is an example flowchart of a method for detecting an artificial intelligence software pipeline, implemented in accordance with an embodiment.

FIG. 4 is an example flowchart of a method for detecting an artificial intelligence software pipeline, implemented in accordance with an embodiment. In some embodiments, an AI pipeline is deployed across multiple computing environments, multiple accounts, utilizing multiple resources, principals, SaaS providers, PaaS provides, combinations thereof, and the like. It is therefore advantageous to generate a representation of the entire AI pipeline, including all components, in order to detect cybersecurity risks, mitigate cybersecurity issues, remediate cybersecurity exposures, exploited vulnerabilities, and the like. It is further advantageous as an AI pipeline is often also deployed across time, e.g., the AI model is trained in a first environment at a first time, and deployed in a second environment at a second time. An AI pipeline lends visibility to this process of bridging computing environments, and bridging time.

At S410, a computing environment is inspected for an AI component. In an embodiment, an AI component is utilized by an AI system. For example, in certain embodiments, an AI model utilizes a storage for storing training data, a training workload utilized to train the AI model, an application for providing input to the trained model, an API to receive calls and utilize the application which utilizes the AI model, and API endpoint to connect the API to an external network, various combinations thereof, and the like. In this example, each such component is an AI component.

In an embodiment, an AI component is detected by an inspector configured to inspect a computing environment, such as a cloud computing environment, a hybrid computing environment, a networked computing environment, a combination thereof, and the like.

In some embodiments, an inspector is configured to detect a cybersecurity object, such as an application, an operating system, a nested workload, a certificate, a password, a cryptographic key, an identity, a library, a binary, a software development kit (SDK), a registry file, a combination thereof, and the like.

In certain embodiments, an inspector is configured to inspect a network of a computing environment (i.e., network inspection) and detect network components, such as firewalls, load balancers, gateways, endpoints, open ports, network paths (including, for example, TCP/IP communication, UDP communication, combinations thereof, and the like).

In some embodiments, an inspector is configured to inspect a cloud computing environment (e.g., cloud scanning) to detect various resources, principals, cloud entities, and the like, which are deployed in the cloud computing environment.

In an embodiment, an inspector is configured to perform static analysis of applications, of SDKs, of registry files, infrastructure as code (IaC) code objects, command line interface (CLI) inspection, a combination thereof, and the like. In some embodiments, the inspector is configured to detect AI components by performing such static analysis.

In certain embodiments, an AI detector is configured to query an identity and access management (IAM) service to detect identities, principals, user accounts, service accounts, roles, combinations thereof, and the like, which are utilized as AI components (i.e., in the AI pipeline). In an embodiment, an identity is determined to be utilized as an AI component in response to detecting a permission which authorizes the identity to act on another AI component (e.g., act on a resource of the AI pipeline).

In some embodiments, an identity is determined to be utilized as an AI component, and a further detection is performed to determine if the identity is authorized to access components, resources, and the like, which are not already identified as AI components.

For example, according to an embodiment, a first identity is determined to be utilized in an AI pipeline in response to determining that the first identity includes a permission to initiate an action in a cloud computing environment on a resource identified as an AI component. In an embodiment, the AI detector is configured to detect additional resources which the first identity has a permission to initiate an action thereupon. In some embodiments, the additional resources are further determined to be AI components.

In some embodiments, an AI detector is configured to determine if a component detected by the inspector is an AI component.

At S420, a connection is detected between AI components. In an embodiment, the connection is detected between a first AI component, and a second AI component. In some embodiments, the connection is detected in response to detecting a shared resource that both AI components act on. In certain embodiments, a connection is detected by querying an IAM service to detect resources which a principal (determined to be an AI component) is authorized to act on.

In an embodiment, an AI detector is configured to detect a connection between AI components, based on, for example, a result of an inspector performing inspection in a computing environment.

In some embodiments, the AI detector is configured to detect a connection between a first AI component deployed in a first computing environment (e.g., a production environment), and a second AI component deployed in a second computing environment (e.g., a development environment).

At S430, a representation is generated in a security database. In an embodiment, a representation is generated for each of: the first AI component, for the second AI component, the connection, etc. In some embodiments, a representation is generated based on a unified data model, such that a resource detected in a first computing environment is represented using the same model as a resource detected in a second computing environment which is different than the first computing environment.

In certain embodiments, the security database is implemented as a graph database, such as a Neo4j® database. In an embodiment, a representation is stored as a node in the graph database. In some embodiments, a relationship between a first AI component and a second AI component, is represented as a connection between representations, e.g., a connection between nodes.

At S440, an AI pipeline is generated. In an embodiment, the AI pipeline includes a representation of an AI pipeline, such as a visual representation. In some embodiments, the AI pipeline includes a plurality of AI components, and the connections between such AI components.

In an embodiment, an AI pipeline includes any of: a cybersecurity finding, a representation of an API endpoint, a representation of an application, a representation of an AI model, a representation of a function, a representation of a virtualization, a representation of a training job, a representation of a training dataset, a representation of a secret, a representation of a computing environment, a representation of an account, a representation of a data, a representation of a data type, any combination thereof, and the like.

In an embodiment, generating an AI pipeline includes generating a visual representation, including a corresponding graphic for each data representation of an AI component, and a graphic representing connections between the different graphics. A visual representation of an AI pipeline is discussed in more detail with respect to FIG. 2, which is an example of one such visual representation.

In some embodiments, it is advantageous to generate a visual representation of an AI pipeline, as AI applications are often deployed across multiple computing environments, including multiple external software providers (e.g., SaaS and PaaS providers), etc.

In certain embodiments, an AI detector is further configured to detect cybersecurity risks based on detecting a plurality of AI components, and further based on detecting a connection between a plurality of AI components.

Figure 5:
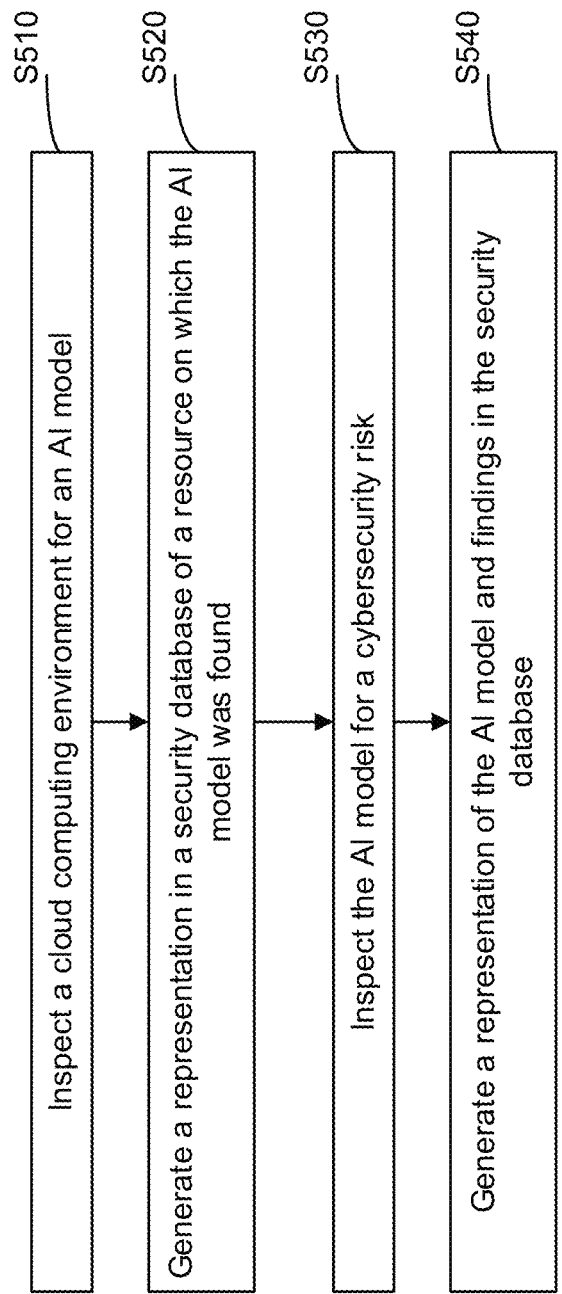
FIG. 5 is an example flowchart of a method for inspecting an AI model deployed in a computing environment, implemented in accordance with an embodiment.

FIG. 5 is an example flowchart of a method for inspecting an AI model deployed in a computing environment, implemented in accordance with an embodiment. In some embodiments, an AI model includes a software file, a software library, a software binary, a combination thereof, and the like. In certain embodiments, an AI model is a cybersecurity object.

At S510, an AI model is detected. In an embodiment, an inspector is configured to detect an AI model, an artifact of an AI model, a combination thereof, and the like. For example, according to an embodiment, an artifact of an AI model is a file, a software library, a software binary, a folder name, various combinations thereof, and the like, which indicate that a known (e.g., previously determined) AI model is installed on a disk, resource, and the like, which is being inspected.

For example, in an embodiment, an inspector is configured to detect a PyTorch framework (e.g., TAR files, including sys_info, pickle, storages, tensors, etc.), a PT file, a SAFETENSORS file, a ZIP file including a PKL file, an H5 file, a PB file, a KERAS file, an a file utilizing ONNX, GGUF, GGML, a combination thereof, and the like.

In some embodiments, a JSON configuration file is inspected to detect a format predetermined to be associated with an AI model, such as HuggingFace format.

In certain embodiments, some file names are changed to a hash. In such an embodiment, an inspector is configured to inspect a JSON (or other markup language) configuration file (e.g., config.json) for a "\model_type\" string which indicates an AI model location.

In other embodiments, files having a certain size, having a size which is less than a predetermined size (e.g., less than 2 KB), and the like, are inspected to detect if they contain therein a "\model_type\" string. As another example, in an embodiment, such files are searched for ".*A.cache/huggingface/hub/.*/blobs/.*" string.

In some embodiments, an AI model is detected by querying an API of a cloud computing infrastructure to receive a list including an identifier of an AI model, an identifier of an AI service, an identifier of an AI code repository, a combination thereof, and the like. In certain embodiments, AI models, services, code repositories, training set databases, combinations thereof, and the like, are discovered by a combination of static analysis techniques (e.g., inspecting disks) and API interface discovery.

At S520, a representation is generated. In an embodiment, a representation of the detected AI model is generated in a security database, wherein the security database further includes a representation of the computing environment.

In some embodiments, the representation of the computing environment includes a representation generated on a predefined unified data schema. In an embodiment, a resource is represented in a security database, for example by a node in a security graph (e.g., utilizing Neo4j). In certain embodiments, a representation of the AI model is connected to a representation of the resource on which it was detected.

For example, in an embodiment, an inspector detects an AI model based on a file in a disk of the virtual machine. According to an embodiment, a representation of the AI model, and a representation of the virtual machine are each generated in a security database, and connected to each other to indicate that the AI model is detected on the virtual machine.

In some embodiments, the representation of the AI model is enriched in the security database. In an embodiment, an inspection controller, enricher, and the like, are configured to enrich the representation based on data, metadata, and the like, extracted by an inspector, extracted from another source, a combination there, and the like.

In an embodiment, an enrichment includes a file name, a file extension, a file type, extracted metadata from GGUF files, extracted metadata from ONNX files, extracted metadata from KERAS files, local metadata extracted from a configuration file (e.g., architecture, model type, model name, transformer version, license, etc.), author identifier, malware detection list, pickle imports, suspicious pickle imports, various combinations thereof, and the like.

At S530, the AI model is inspected. In an embodiment, the AI model is inspected for a cybersecurity object, a cybersecurity risk, a misconfiguration, a vulnerability, an exposure, a combination thereof, and the like.

For example, according to an embodiment, inspecting the AI model includes determining if the model is configured to run code (e.g., through a pickle file), a list of functions which are allowed, a list of functions which are blocked, and the like.

In an embodiment, inspecting an AI model includes determining if the AI model matches a version, identifier, and the like, of an AI model which is previously determined as a cybersecurity risk.

In certain embodiments, inspecting an AI model includes detecting a file, a code, and the like, which the AI model is configured to execute. In some embodiments, inspecting the AI model includes detecting a secret, a code, and the like, for example stored in a pickle file, which the AI model, when prompted with an appropriate prompt, is configured to output, leading to leaked data, leaked secrets, etc.

In some embodiments, inspection of an AI model includes generating a finding. In an embodiment, a finding is a data record indicating a detected cybersecurity risk, misconfiguration, vulnerability, exposure, combination thereof, and the like.

In an embodiment, a security database, inspection controller, and the like, is configured to generate a lateral movement path. For example, in an embodiment, where a secret is detected in an AI model, a representation of the secret is generated. In some embodiments, the representation of the secret already preexists in the security database, and a representation of the AI model is connected to the preexisting representation of the secret.

In some embodiments, a lateral movement path is generated to include resources, nodes, representations, and the like, between the AI model and another resource. For example, in an embodiment, the secret detected in the AI model is also utilized by an administrator account to access a storage in a cloud computing environment, therefore a lateral movement path includes the AI model, the secret, the administrator account, and the storage.

In certain embodiments, inspecting an AI model further includes detecting an anomaly. For example, according to an embodiment, detecting an anomaly respective of an AI model includes detecting a training set including data not used for training other models. In an embodiment, detecting an anomaly includes detecting a suspicious prompt provided to the AI model (e.g., a prompt utilizing code, attempting to execute code, attempting to extract a secret, etc.).

At S540, a representation of the AI model is generated. In an embodiment, the representation of the AI model is generated in a security graph. In some embodiments, a representation of a finding based on inspection of the AI model is further stored in the security database, and connected to the representation of the AI model.

In certain embodiments, the security representation is utilized to apply a policy on a computing environment, the computing environment having a representation stored in the security database as part of the security representation.

For example, in an embodiment, a policy includes a rule, a conditional rule, a plurality of each, a combination thereof, and the like, which applied to the representation of the computing environment, the representation of the AI model, a representation of a cybersecurity object, a combination thereof, and the like.

Figure 6:
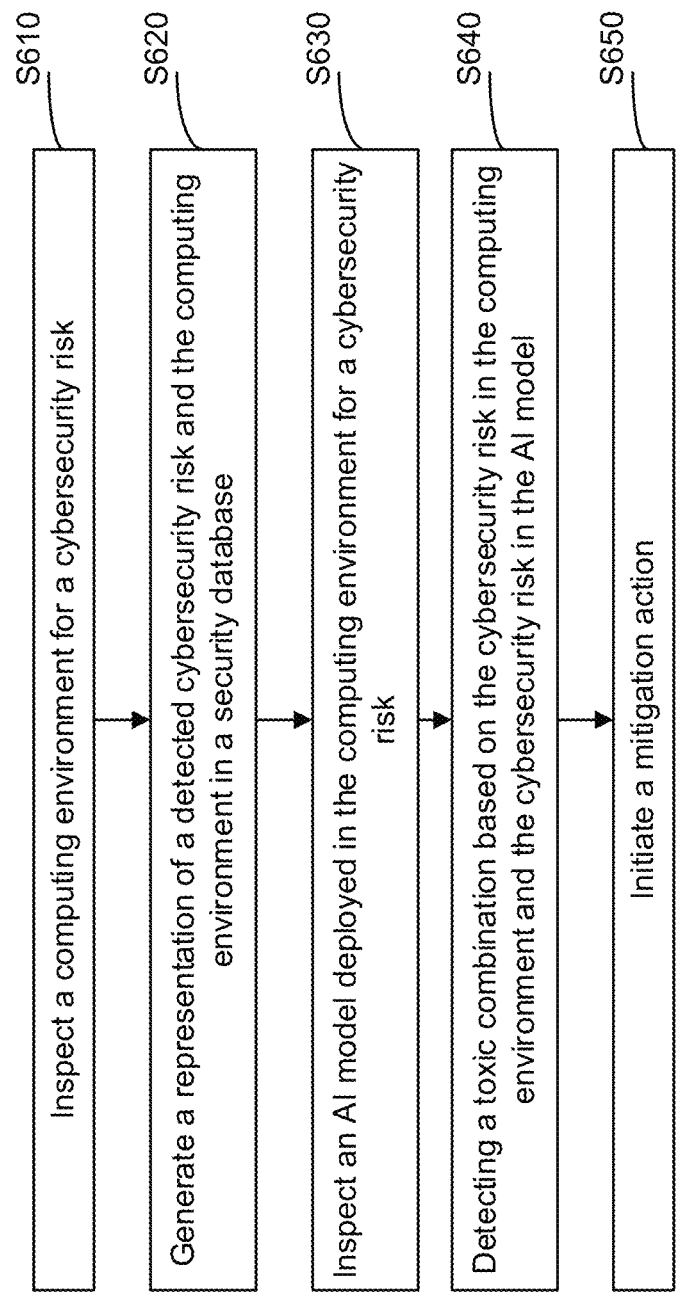
FIG. 6 is an example flowchart of a method for initiating a mitigation action on a cybersecurity risk of an AI model, implemented in accordance with an embodiment.

FIG. 6 is an example flowchart of a method for initiating a mitigation action on a cybersecurity risk of an AI model, implemented in accordance with an embodiment. In an embodiment, a cybersecurity risk is detected with respect to an AI model utilizing, for example, the method of FIG. 5 above.

At S610, a computing environment is inspected. In an embodiment, the computing environment is inspected for a cybersecurity object, a cybersecurity risk, a cybersecurity threat, a vulnerability, an exposure, a misconfiguration, a combination thereof, and the like.

In an embodiment, a cybersecurity object includes a code object, a secret, a certificate, a hash, a file, a folder, a software artifact, a software application, an operating system, a malware object, a combination thereof, and the like.

In certain embodiments, a cybersecurity object indicates a cybersecurity risk, a cybersecurity threat, a misconfiguration, a vulnerability, an exposure, a combination thereof, and the like.

In an embodiment, inspecting a computing environment includes generating an inspectable disk based on an original disk. In some embodiments, generating an inspectable disk includes generating a clone of an original disk, a snapshot of an original disk, a copy of an original disk, a combination thereof, and the like, and inspecting the cloned disk for a cybersecurity object.

In some embodiments, an inspectable disk is released once inspection is complete. In an embodiment, an inspector, inspection controller, and the like, is configured to generate a finding of a cybersecurity object on an inspectable disk, wherein the finding is a data record stored in a security database. In an embodiment, the finding (i.e., the representation of the finding, the data record, etc.) is connected to a representation of a resource on which the finding is detected.

At S620, a representation is generated. In an embodiment, a representation is generated for a resource, a cybersecurity objected detected on the resource, a finding based on a cybersecurity object detected on the resource, a combination thereof, and the like.

In some embodiments, the representation is stored in a security database, wherein the security database is further configured to store a representation of a computing environment in which the resource is deployed.

In some embodiments, a representation is enriched in the security database. In an embodiment, an inspection controller, enricher, and the like, are configured to enrich the representation based on data, metadata, and the like, extracted by an inspector, extracted from another source, a combination there, and the like.

At S630, an AI model is inspected. According to an embodiment, an AI model is detected on a resource, in a resource, etc., wherein the resource is deployed in the computing environment. In an embodiment, the AI model is inspected for a cybersecurity object, a cybersecurity risk, a misconfiguration, a vulnerability, an exposure, a combination thereof, and the like.

For example, according to an embodiment, inspecting the AI model includes determining if the model is configured to run code (e.g., through a pickle file), a list of functions which are allowed, a list of functions which are blocked, and the like.

In an embodiment, inspecting an AI model includes determining if the AI model matches a version, identifier, and the like, of an AI model which is previously determined as a cybersecurity risk.

In certain embodiments, inspecting an AI model includes detecting a file, a code, and the like, which the AI model is configured to execute. In some embodiments, inspecting the AI model includes detecting a secret, a code, and the like, for example stored in a pickle file, which the AI model, when prompted with an appropriate prompt, is configured to output, leading to leaked data, leaked secrets, etc.

In some embodiments, inspection of an AI model includes generating a finding. In an embodiment, a finding is a data record indicating a detected cybersecurity risk, misconfiguration, vulnerability, exposure, combination thereof, and the like.

In an embodiment, a security database, inspection controller, and the like, is configured to generate a lateral movement path. For example, in an embodiment, where a secret is detected in an AI model, a representation of the secret is generated. In some embodiments, the representation of the secret already preexists in the security database, and a representation of the AI model is connected to the preexisting representation of the secret.

In some embodiments, a lateral movement path is generated to include resources, nodes, representations, and the like, between the AI model and another resource. For example, in an embodiment, the secret detected in the AI model is also utilized by an administrator account to access a storage in a cloud computing environment, therefore a lateral movement path includes the AI model, the secret, the administrator account, and the storage.

In certain embodiments, inspecting an AI model further includes detecting an anomaly. For example, according to an embodiment, detecting an anomaly respective of an AI model includes detecting a training set including data not used for training other models. In an embodiment, detecting an anomaly includes detecting a suspicious prompt provided to the AI model (e.g., a prompt utilizing code, attempting to execute code, attempting to extract a secret, etc.).

At S640, a toxic combination is detected. In an embodiment, a toxic combination is detected based on detecting a cybersecurity object, and detecting an AI model. For example, in an embodiment, the cybersecurity object is a secret, such as a secret utilized by the AI model.

In an embodiment, a toxic combination is detected by utilizing the representation stored in the security database. For example, in some embodiments, utilizing the representation includes applying a policy on the representation, querying the representation, traversing a graph utilized as the representation, a combination thereof, and the like.

In certain embodiments, the security representation is utilized to apply a policy on a computing environment, the computing environment having a representation stored in the security database as part of the security representation.

For example, in an embodiment, a policy includes a rule, a conditional rule, a plurality of each, a combination thereof, and the like, which applied to the representation of the computing environment, the representation of the AI model, a representation of a cybersecurity object, a combination thereof, and the like.

In some embodiments, a policy includes a rule to detect a toxic combination. For example, in an embodiment, a policy includes a rule applied to the representation to detect a finding connected to a resource, and an AI model connected to the resource.

At S650, a mitigation action is initiated. In an embodiment, a mitigation action is initiated based on a toxic combination, the detected cybersecurity object, an AI model type, a combination thereof, and the like.

In some embodiments, a mitigation action includes revoking access from a principal, revoking access to a resource, revoking access from a resource, sandboxing a resource, revoking access to an AI model, revoking access from an AI model, denying network communication directed to the AI model, such as network communication including a prompt for the AI model, generating an alert, updating an alert, generating an alert severity, updating an alert severity, various combinations thereof, and the like.

In certain embodiments, an inspection environment is configured to provide a remediation infrastructure. In an embodiment, the inspection environment is configured to deploy the remediation infrastructure in the computing environment. In some embodiments, the remediation infrastructure includes a plurality of remediation scripts, mitigation actions, a combination thereof, and the like.

FIG. 7 is an example schematic diagram of an AI detector 138 according to an embodiment. The AI detector 138 includes a processing circuitry 710 coupled to a memory 720, a storage 730, and a network interface 740. In an embodiment, the components of the AI detector 138 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof. In an embodiment, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein may be stored in the storage 730, in the memory 720, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 740 is configured to provide the AI detector 138 with communication with, for example, the inspector 132, the inspection controller 134, the security database 136, and the like.

It should be understood that the embodiments described herein are not limited to the specific architecture illustrated in FIG. 7, and other architectures may be equally used without departing from the scope of the disclosed embodiments.

Furthermore, in certain embodiments the inspector 132, the inspection controller 134, the security database 136, and the like, may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting a combined cybersecurity risk for an artificial intelligence (AI) model, comprising:
   detecting an AI model deployed in a computing environment;
   generating a representation of the AI model in a security database, the security database including a representation of the computing environment;
   detecting in the AI model a first cybersecurity object;
   detecting in the computing environment a second cybersecurity object;
   determining that the AI model is exposed to a toxic combination cybersecurity risk based on the detected first cybersecurity object and the detected second cybersecurity object; and
   initiating a mitigation action based on the toxic combination cybersecurity risk.

2. The method of claim 1, further comprising:
   initiating the mitigation action based on the first cybersecurity object.

3. The method of claim 1, further comprising:
   initiating the mitigation action further based on the second cybersecurity object.

4. The method of claim 1, further comprising:
   generating an inspectable disk based on an original disk of a resource deployed in the computing environment; and
   inspecting the inspectable disk for any one of: the AI model, the second cybersecurity object, and a combination thereof.

5. The method of claim 4, further comprising:
   detecting an artifact of the AI model on the inspectable disk.

6. The method of claim 5, wherein the artifact is any one of: a file, a software library, a software binary, a folder name, a hash, and any combination thereof.

7. The method of claim 1, further comprising:
   detecting that the AI model is configured to execute a code object.

8. The method of claim 1, further comprising:
   detecting a metadata of the AI model, wherein the metadata indicates that the AI model is associated with a cybersecurity risk.

9. The method of claim 1, further comprising:
   detecting in the AI model any one of: a secret, a certificate, a code, and any combination thereof.

10. The method of claim 1, further comprising:
    applying a policy on the representation of the AI model.

11. The method of claim 10, further comprising:
    initiating the mitigation action based on a result of applying the policy.

12. The method of claim 1, wherein the toxic combination cybersecurity risk is any one of: a vulnerability, an exposure, a misconfiguration, and a combination thereof.

13. A non-transitory computer-readable medium storing a set of instructions for detecting a combined cybersecurity risk for an artificial intelligence (AI) model, the set of instructions comprising:
    one or more instructions that, when executed by one or more processors of a device, cause the device to:
       detect an AI model deployed in a computing environment;
       generate a representation of the AI model in a security database, the security database including a representation of the computing environment;
       detect in the AI model a first cybersecurity object;
       detect in the computing environment a second cybersecurity object;
       determine that the AI model is exposed to a toxic combination cybersecurity risk based on the detected first cybersecurity object and the detected second cybersecurity object; and
       initiate a mitigation action based on the toxic combination cybersecurity risk.

14. A system for detecting a combined cybersecurity risk for an artificial intelligence (AI) model comprising:
    a processing circuitry;
    a memory, the memory containing instructions that, when executed by the processing circuitry, configure the system to:
    detect an AI model deployed in a computing environment;
    generate a representation of the AI model in a security database, the security database including a representation of the computing environment;
    detect in the AI model a first cybersecurity object;
    detect in the computing environment a second cybersecurity object;
    determine that the AI model is exposed to a toxic combination cybersecurity risk based on the detected first cybersecurity object and the detected second cybersecurity object; and initiate a mitigation action based on the toxic combination cybersecurity risk.

15. The system of claim 14, wherein the memory contains further instructions which when executed by the processing circuitry further configure the system to:
   initiate the mitigation action based on the first cybersecurity object.

16. The system of claim 14, wherein the memory contains further instructions which when executed by the processing circuitry further configure the system to:
   initiate the mitigation action further based on the second cybersecurity object.

17. The system of claim 14, wherein the memory contains further instructions which when executed by the processing circuitry further configure the system to:
   generate an inspectable disk based on an original disk of a resource deployed in the computing environment; and
   inspect the inspectable disk for any one of:
   the AI model, the second cybersecurity object, and a combination thereof.

18. The system of claim 17, wherein the memory contains further instructions which when executed by the processing circuitry further configure the system to:
   detect an artifact of the AI model on the inspectable disk.

19. The system of claim 18, wherein the artifact is any one of:
   a file, a software library, a software binary, a folder name, a hash, and any combination thereof.

20. The system of claim 14, wherein the memory contains further instructions which when executed by the processing circuitry further configure the system to:
   detect that the AI model is configured to execute a code object.

21. The system of claim 14, wherein the memory contains further instructions which when executed by the processing circuitry further configure the system to:
   detect a metadata of the AI model, wherein the metadata indicates that the AI model is associated with a cybersecurity risk.

22. The system of claim 14, wherein the memory contains further instructions which when executed by the processing circuitry further configure the system to:
   detect in the AI model any one of:
   a secret, a certificate, a code, and any combination thereof.

23. The system of claim 14, wherein the memory contains further instructions which when executed by the processing circuitry further configure the system to:
   apply a policy on the representation of the AI model.

24. The system of claim 23, wherein the memory contains further instructions which when executed by the processing circuitry further configure the system to:
   initiate the mitigation action based on a result of applying the policy.

25. The system of claim 14, wherein the toxic combination cybersecurity risk is any one of:
   a vulnerability, an exposure, a misconfiguration, and a combination thereof.

* * * * *